US009002200B2

(12) United States Patent
Auge

(10) Patent No.: US 9,002,200 B2
(45) Date of Patent: Apr. 7, 2015

(54) DYNAMIC EVALUATION OF THE OPTICAL MULTIPLEX SECTION PER-CHANNEL PRE-EMPHASIS POWER

(75) Inventor: Jean-Luc Auge, Lannion (FR)

(73) Assignee: Alcatel Lucent, Boulogne-Billancourt (FR)

( * ) Notice: Subject to any disclaimer, the term of this patent is extended or adjusted under 35 U.S.C. 154(b) by 105 days.

(21) Appl. No.: 13/885,562

(22) PCT Filed: Nov. 18, 2011

(86) PCT No.: PCT/EP2011/070493
§ 371 (c)(1),
(2), (4) Date: Jun. 17, 2013

(87) PCT Pub. No.: WO2012/084365
PCT Pub. Date: Jun. 28, 2012

(65) Prior Publication Data
US 2014/0147113 A1   May 29, 2014

(30) Foreign Application Priority Data
Dec. 20, 2010   (EP) .................................... 10306462

(51) Int. Cl.
*H04B 10/08*   (2006.01)
*H04B 10/079*   (2013.01)
(Continued)

(52) U.S. Cl.
CPC ...... *H04B 10/07955* (2013.01); *H04B 10/2935* (2013.01); *H04B 10/294* (2013.01); *H04B 10/564* (2013.01); *H04J 14/0221* (2013.01)

(58) Field of Classification Search
USPC .............................................. 398/25–27, 94
See application file for complete search history.

(56) References Cited

U.S. PATENT DOCUMENTS

2002/0163683 A1   11/2002   Antoniades et al.
2002/0191903 A1   12/2002   Neuhauser
(Continued)

FOREIGN PATENT DOCUMENTS

EP   2053771   4/2009

OTHER PUBLICATIONS

Carena, A. et al; On the Optimization of Hybrid Raman/Erbium-Doped Fiber Amplifiers; IEEE Photonics Technology Letters, IEEE Service Center, Piscataway, NJ; US; pp. 1170-1172; vol. 13, No. 11; Nov. 1, 2001; XP011047819; ISSN: 1041-1135.
(Continued)

*Primary Examiner* — Dzung Tran
(74) *Attorney, Agent, or Firm* — Carmen Patti Law Group, LLC

(57) ABSTRACT

An apparatus and method of pre-emphasising a launch power profile of a section in an optical network is provided. The method comprises measuring the output power at the output of the section, determining the predicted output power associated with a flat launch power profile using design characteristics of the section and determining the total power deviation between the measured output power and the predicted output power. Also, the method comprises determining the signal to noise ratio deviation and the nonlinear phase shift deviation as a function of the total power deviation, and pre-emphasising the launch power profile based on a function of the calculated signal to noise ratio deviations of each span and the calculated nonlinear phase shift deviations of each span, such that the sum of the nonlinear phase shift deviations and the sum of the signal to noise ratio deviations of each channel are reduced by an equal amount.

11 Claims, 2 Drawing Sheets

(51) Int. Cl.
*H04B 10/293* (2013.01)
*H04B 10/294* (2013.01)
*H04B 10/564* (2013.01)
*H04J 14/02* (2006.01)

(56) References Cited

U.S. PATENT DOCUMENTS

2003/0016411 A1* 1/2003 Zhou et al. .................... 359/110
2004/0052526 A1* 3/2004 Jones et al. .................... 398/50
2004/0208531 A1* 10/2004 Bosloy et al. .................. 398/33
2005/0180757 A1* 8/2005 Nissov et al. .................. 398/147
2006/0245765 A1* 11/2006 Elahmadi et al. ............. 398/189
2007/0222654 A1* 9/2007 Vrazel et al. .................. 341/144

OTHER PUBLICATIONS

Tong, Z. et al; Theoretical Investigation and Optimization of Bi-Directionally Pumped Broadband Fiber Raman Amplifiers; Optics Communications, North-Holland Publishing Co. Amsterdam, NL; vol. 217, No. 1-6; Mar. 1, 2003; pp. 401-413; XP004411891; ISSN: 0030-4018; DOI:DOI:10.1016/S0030-4018(03)01118-0.

* cited by examiner

DYNAMIC EVALUATION OF THE OPTICAL MULTIPLEX SECTION PER-CHANNEL PRE-EMPHASIS POWER

TECHNICAL FIELD

The present invention relates to the field of optical networks. More specifically, the present invention relates to the optimisation of per-channel pre-emphasis power in an optical multiplexed section.

BACKGROUND

Many optical networks comprise Wavelength Selective Switches (WSS) interconnected by Optical Multiplex Sections (OMS), each comprising a plurality of fibre optic spans. In such networks, signals of different wavelengths, known as channels, are multiplexed together and transmitted through the same OMS. The fibre optic spans making up the section of an OMS will typically be separated by optical amplifiers which will act as transponders, thereby receiving a degraded signal at the end of a first span, and transmitting a stronger signal at the start of the next span.

This process of re-amplification, whilst prolonging the OMS length, does itself introduce some errors into the signal. Moreover, the amount and impact that these errors will have will vary depending on the bandwidth and wavelength of each channel. There are several causes of per-channel power errors in a system related to gain mode amplifiers. Such factors include gain errors, tilt and ripple. In order to mitigate the effects of these errors, several methods have been developed to optimise the power level of signal input into an OMS.

One such method is Automatic Pre-emphasis Adjustment (APA), which is a power optimization technique which works on a link basis from a transmission point to a reception point. APA typically consists of monitoring the Bit Error Rate (BER) at a receiver and varying the per-channel pre-emphasis applied to the transmitter. This closed loop algorithm aims to tune the per-channel pre-emphasis in such a way as to optimise the resulting BER at the receiver end. One disadvantage of the APA technique is that it is suitable only for point-to-point routes, in that it requires the BER information to be fed back to the transmission side for each route in the network. Accordingly, using APA, the power algorithms required to calculate the per-channel pre-emphasis in a meshed network would become prohibitively complex.

A method which is compatible with meshed networks is enhanced Automatic Power Equalization (APE), which consists of equalizing the power of all channels (i.e. flat launch) at the beginning of each section, and enhancing the flat launch with a pre-emphasis profile in order to reduce gain errors. Currently, the required pre-emphasis profile is typically estimated using measurements taken by an Optical Channel Monitor (OCM), which can only provide per-channel power information and is therefore a much less reliable quality of transmission (QoT) indicator than the BER. Proposals put forth in the prior art relating to enhanced APE teach setting the pre-emphasis power to half of the measured per-channel power deviation at the end of the Optical Multiplex Section. This estimation does not take into account any disparities between the output powers of the various amplifiers in the OMS, nor does it take into account any differences between the span losses in the OMS.

Accordingly, when these differences are particularly acute (i.e. in the case of an OMS with large span and amplifier power heterogeneity), the above pre-emphasis estimation will significantly diverge from the optimal pre-emphasis profile.

There is therefore a need for an improved method of determining the per-channel power pre-emphasis needed in an OMS.

SUMMARY

In order to address the problems associated with the prior art, the present invention provides a method of pre-emphasising the launch power profile of a section in an optical network, the section comprising a plurality of fibre optic spans, each span being separated by an amplifier, the method comprises the steps of:

measuring, for each channel of the section, the output power at the output of the section;

determining, for each channel of the section, the predicted output power associated with a flat launch power profile using design characteristics of the section;

determining, for each channel of the section, the total power deviation between the measured output power and the predicted output power;

determining, for each channel of each plurality of fibre optic spans, the signal to noise ratio deviation as a function of the total power deviation;

determining, for each channel of each plurality of fibre optic spans, the nonlinear phase shift deviation as a function of the total power deviation; and pre-emphasising the launch power profile based on a function of the calculated signal to noise ratio deviations of each span and the calculated nonlinear phase shift deviations of each span, such that the sum of the nonlinear phase shift deviations and the sum of the signal to noise ratio deviations of each channel are reduced by an equal amount.

Preferably, the step of determining the signal to noise ratio deviation also comprises using the output gain of the respective span with respect to the input power of the section; and the step of determining the nonlinear phase shift deviation also comprises using the input gain of the respective span with respect to the input power of the section.

Preferably, the section is an Optical Multiplex Section between two Wavelength Selective Switches.

Preferably, the power profile comprises a plurality of channels.

Preferably, the design characteristics of the section used to determine the predicted output power associated with a flat launch power profile include at least one of: the length associated with each of the plurality of spans, the type of fibre optic cable of the plurality of spans and the type of amplifier used in the section.

The present invention also provides an apparatus for pre-emphasising the launch power profile of a section in an optical network, the section comprising a plurality of fibre optic spans, each span being separated by an amplifier, the apparatus comprises:

measuring means arranged to measure, for each channel of the section, the output power at the output of the section;

predicted output power determining means arranged to determine, for each channel of the section, the predicted output power associated with a flat launch power profile using design characteristics of the section;

total power deviation determining means arranged to determine, for each channel of the section, the total power deviation between the measured output power and the predicted output power;

signal to noise ratio deviation determining means arranged to determine, for each channel of each plurality of fibre optic spans, the signal to noise ratio deviation as a function of the total power deviation;

nonlinear phase shift deviation determining means arranged to determine, for each channel of each plurality of fibre optic spans, the nonlinear phase shift deviation as a function of the total power deviation; and pre-emphasis control means arranged to pre-emphasise the launch power profile based on a function of the calculated signal to noise ratio deviations of each span and the calculated nonlinear phase shift deviations of each span, such that the sum of the nonlinear phase shift deviations and the sum of the signal to noise ratio deviations of each channel are reduced by an equal amount.

Preferably, the signal to noise ratio deviation determining means is further arranged to use the output gain of the respective span with respect to the input power of the section in order to determine the signal to noise ratio deviation; and the nonlinear phase shift deviation determining means is further arranged to use the input gain of the respective span with respect to the input power of the section in order to determine the nonlinear phase shift deviation.

Preferably, the section is an Optical Multiplex Section between two Wavelength Selective Switches.

Preferably, the power profile comprises a plurality of channels.

Preferably, the predicted output power determining means is further arranged to determine the predicted output power associated with a flat launch power profile by using at least one of: the length associated with each of the plurality of spans, the type of fibre optic cable of the plurality of spans and the type of amplifier used in the section.

The present invention also provides a computer program comprising computer readable code adapted to perform the steps of the above method when the program is run on a computer.

As will be appreciated, the present invention provides several advantages over the prior art. For example, because the present invention is not dependent on the measurement of BER at a receiving end in a point-to-point link, it will be possible to use the present invention for a single OMS, which makes the present invention particularly advantageous when used in meshed optical networks.

Moreover, the present invention provides a better estimation of the required pre-emphasis profile needed for a given OMS (at least 10% improvement over the pre-emphasis solutions of the prior art). This advantage is particularly evident in situations where an OMS comprises a series of spans having unequal lengths and/or amplifiers having unequal output powers.

Furthermore, the present invention does not require any additional hardware to be installed in the network, and can simply be implemented by determining the relative Nonlinear Phase Shift (NPS) and Optical Signal to Noise Ratio (OSNR) weights of each span. Because only the relative (as opposed to the absolute) contributions are required, the information needed to carry out the invention can easily be determined by design and does not change in the course the network's life. Also, the present invention is independent of the amplifier Noise Figure (NF), the span lengths, the fibre type and each transponder's OSNR target and non linear threshold.

DESCRIPTION OF THE DRAWINGS

Specific and non-limiting embodiments of the present invention will now be described with reference to the attached drawings, in which.

DETAILED DESCRIPTION

Figure 1:
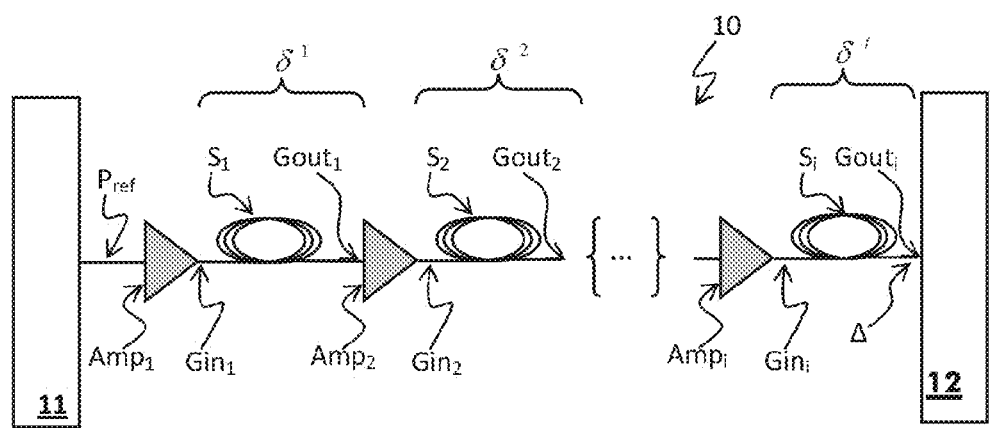
FIG. 1 is a schematic diagram of an OMS in accordance with one embodiment of the present invention.

FIG. 1 shows a typical Optical Multiplex Section (OMS) 10 comprising a Wavelength Selective Switch (WSS) 11, a plurality of fiber spans $S_1, S_2, \ldots, S_i$ each separated by an optical amplifier $Amp_1, Amp_2, \ldots, Amp_i$. Note that FIG. 1 only shows a single direction of the OMS. Typically, OMSs are bi-directional and comprise two sequences of spans between each WSS 11, 12, one for each direction.

Whilst FIG. 1 shows a plurality of spans $S_1, S_2, \ldots, S_i$ having similar length, it will be appreciated that each span length can differ significantly. Moreover, the optical amplifiers $Amp_1, Amp_2, \ldots, Amp_i$ can also vary in terms of design, quality and output power. The abovementioned variations will affect signal degradation in different ways.

In a system as shown in FIG. 1, there are three main causes of per-channel power errors; namely tilt, gain error and peak-to-peak ripple. Because the losses due to tilt are much greater than those attributable to either gain error or peak-to-peak ripple, tilt must be compensated for by each amplifier $Amp_1$, $Amp_2, \ldots, Amp_i$, whenever possible. For the purposes of this disclosure, it will therefore be assumed that the tilt is compensated for at amplifier level.

The remaining gain error and peak-to-peak ripple can be compensated by gain equalizers which are typically positioned at every 6 spans. When flat equalization is performed however, while accumulation of these effects may be stopped, there remains an OSNR and NPS penalty caused by the power excursions. The OSNR penalty from negative power excursions with respect to average power can be calculated as follows:

$$OSNR\_Pen = 10\log(N) - 10\log\left(\frac{linR - linR^{N+1}}{1 - linR}\right),$$

, where R is the per-span negative excursion and N the number of spans in the OMS. The NPS however is not readily estimated, as it depends on several factors, such as the transmission format and the nature of the link. As described above, known methods of trying to compensate for these penalties have focused on pre-emphasizing each channel of the launch power profile using half of the measured power excursion. As discussed above, this is not an optimal way of pre-emphasizing, for several reasons.

As will now be described, the present invention provides a better method of setting the launch power profile pre-emphasis. In FIG. 1, "Δ" represents the total per-channel power deviation at the end of the OMS. The per-channel power deviation Δ is the deviation between the per-channel output power measured at the end of the OMS and the calculated per-channel output power in response to a flat launch power profile. The calculated per-channel output power is based on design characteristics of the OMS, and more specifically, how these design characteristics will affect the channel power profile when a flat power profile (i.e. no pre-emphasis) is used at the beginning of the OMS. Design characteristics which can be used for these calculation can include span length, fiber type/loss and amplifier type. As will be appreciated, other OMS characteristics could be included to produce a more accurate calculation.

It is known that a short span with a low input power will provide a relatively low Nonlinear Phase Shift (NPS) contribution and will have a relatively high Optical Signal to Noise Ratio (OSNR). Accordingly, for a given power deviation, such a span will provide a smaller contribution to the overall penalty than a high input power span with a low OSNR. Moreover, because the power deviation is cumulative, the resulting penalty will vary depending on whether the high input power span with a low OSNR is at the beginning of the OMS, or at the end of the OMS.

Furthermore, the power deviation penalty of a given span is the combination of its NPS deviation, which is linked to the span's input power, and its OSNR deviation, which is linked to the span's output power or, to the input power of the next amplifier. For example, a relatively long span that has a relatively low input power will contribute more OSNR than NPS to the overall penalty.

As will be appreciated, a transmission system exhibits maximum reach when OSNR and NPS budgets are consumed equally. To exactly compensate for this through pre-emphasis however, it is necessary to determine the absolute OSNR and NPS contributions for each span.

As has been appreciated by the Applicant however, it is not necessary to determine the absolute OSNR and NPS contributions of each individual span in an OMS in order to achieve a good approximation of these. It is possible to estimate the absolute contributions by using the OSNR and NPS deviations with respect to an average power (i.e. flat launch) to determine the relative contribution of each span.

When a fixed reference power $P_{ref}$ is defined at the input of the OMS, each span $S_1, S_2, \ldots, S_i$ will have an input gain relationship $Gin_1, Gin_2, \ldots, Gin_i$ with respect to $P_{ref}$ and an output gain relationship $Gout_1, Gout_2, \ldots, Gout_i$, also with respect to $P_{ref}$. These gain relationships, which are used as a weighting function, are dependent on design parameters and therefore do not change.

Thus, whilst it may be onerous to measure the absolute OSNR and NPS contributions of an individual OMS, the Applicant has appreciated that it is possible to achieve a very good approximation of these absolute contributions using the OSNR and NPS deviations calculated using the reference power $P_{ref}$ at the beginning of the OMS, and the total per-channel power deviation Δ at the output of the OMS, together with some knowledge of the gain relationships of each span with respect to $P_{ref}$.

The relative contributions are estimated with respect to span input and output powers. The gain relationships between all spans and the fixed power reference $P_{ref}$ at the input of the OMS represent a span's individual weight with respect to its OSNR and NPS contributions to the total OMS's OSNR and NPS. A span's input and output powers can easily be used to determine the input gain relationship $Gin_1, Gin_2, \ldots, Gin_i$ with respect to $P_{ref}$ and an output gain relationship $Gout_1, Gout_2, \ldots, Gout_i$, also with respect to $P_{ref}$. As mentioned above, tilt penalties will typically be corrected at amplifier level. To do this, each amplifier must accurately measure its input power and output power. Thus, in a preferred embodiment, each amplifier in the OMS will send its input power measurement and output power measurement back to the WSS, which measurements will be used to calculate the gain relationships in accordance with the present invention. Accordingly, in a system in accordance with the present invention, the input and output values for each span can be received from the span itself (that is to say through the OMS) or could be measured by any other means.

Figure 2:
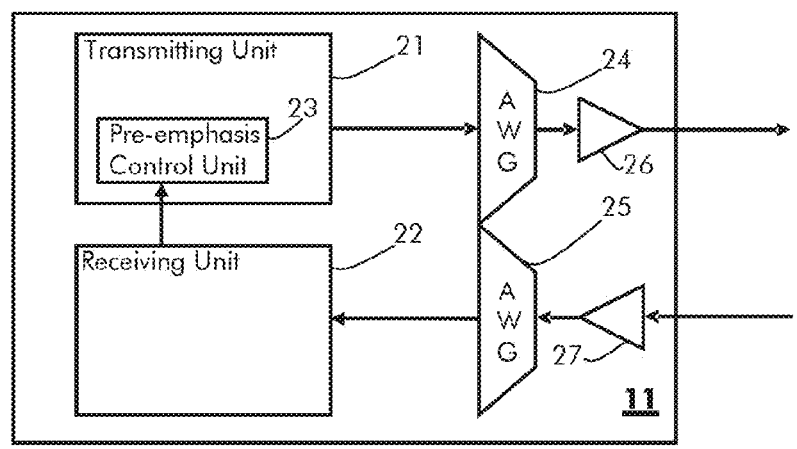
FIG. 2 is a functional block diagram of a Wavelength Selective Switch (WSS) in accordance with one embodiment of the present invention.

FIG. 2 is a simplified functional block diagram of a Wavelength Selective Switch (WSS) 11 in accordance with the present invention. The WSS 11 comprises a transmitting unit 21 including a pre-emphasis control unit 23 which is tasked with calculating the amount of pre-emphasis to apply to the output signal of the WSS. The transmitting unit 21 is connected to an Arrayed Waveguide Grating (AWG) optical multiplexer 24 and a pre-amplifier 26, which is in turn connected to the first span $S_1$ in the OMS of FIG. 1.

As shown in FIG. 2, the WSS 20 also comprises a post-amplifier 27 connected to an AWG optical demultiplexer 25, which in turn is connected to a receiving unit 22. As described above, the input power and output power of each span (i.e. the output power of a particular span's amplifier and the input power of the next span's amplifier, respectively) are provided to the WSS 11 via the returning sequence of spans (not shown in FIG. 1) and will be received by the receiving unit 22. Once received, that same power information is passed to a pre-emphasis control unit 23, which forms part of the transmitting unit 21. As explained below, the pre-emphasis control unit 23 uses the power information to determine the amount of pre-emphasis to add to each channel of the launch power profile. The pre-emphasis control unit 23 comprises all necessary input/output and data processing means to carry out the following method.

Figure 3:
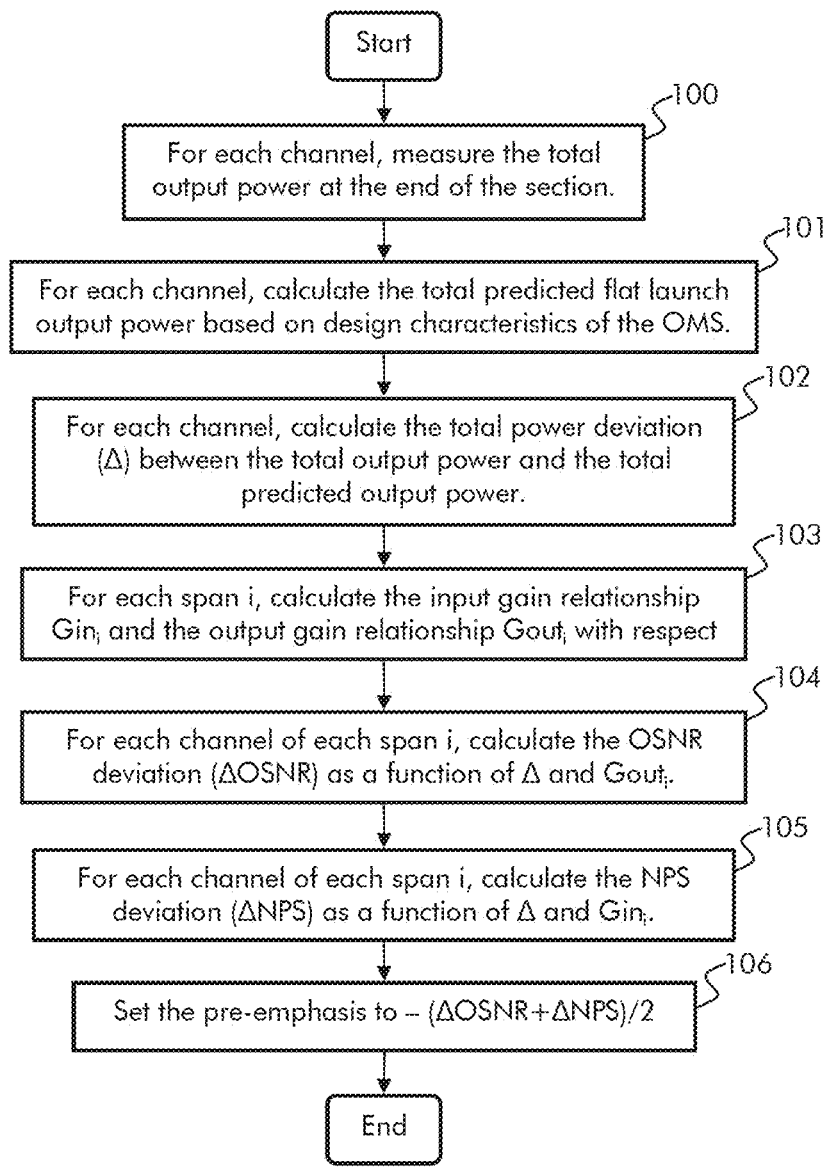
FIG. 3 is a flow diagram of a method in accordance with one embodiment of the present invention.

With reference to FIGS. 1 to 3, the method performed by a system in accordance with the present invention will now be described.

In step 100, the total output power of each channel at the end of the OMS 10 is measured at the output of the OMS. This can be done by having WSS 12 take a power reading at its input, and sending that information to the pre-emphasis control unit 23 of WSS 11. Any other suitable method of taking this measurement can also be used.

In step 101, the pre-emphasis control unit 23 will determine the total predicted flat launch output power of the OMS, based on certain design characteristics of the OMS 10. As stated above, the total predicted flat launch per-channel output power is a calculation which is known to those skilled in the art and, for the sake of brevity, will not be repeated here.

In step 102, the per-channel output power deviation Δ of the OMS 10 is calculated using the measured values (for each channel) of the total output power measured in step 100, and the total predicted flat launch output power of the OMS, determined in step 101. The per-channel power deviation Δ is the difference between the measured per-channel output power and the predicted flat launch per-channel output power.

Using the total per-channel output power deviation Δ, it is possible to estimate the per-channel power deviation δ (in dB) for each span i, which will be equal to the total per-channel power deviation Δ, divided by the number of spans N.

$$\delta = \Delta/N (dB)$$

Then, in step 103, the pre-emphasis control unit 23 determines the input gain relationship $Gin_i$ and the output gain relationship $Gout_i$ for each span i. The input gain relationship $Gin_i$ and the output gain relationship $Gout_i$ of each span are, as described above, the gain relationships of the input and output of each span, with respect to $P_{ref}$ as shown in FIG. 1.

Using the estimated per-channel power deviation for each span, it is possible to determine the NPS contribution of each span i, as follows:

$$NPS_i = P_{ref} \cdot Gin_i \cdot Zeff_i$$

Where, i is the span number, $Gin_i$ is the input gain relationship of span i, and $Zeff_i$ is the effective length of the span. When taking into account ripple, this equation becomes:

$$NPS_i = P_{ref} \cdot Gin_i \cdot \delta^i \cdot Zeff_i$$

, where $\delta^i$ is the estimated per-channel power deviation for a span, elevated to the power of i. Similarly, using the estimated per-channel power deviation for each span, it is possible to determine the OSNR contribution of each span i, as follows:

$$OSNR_i = P_{ref} \cdot Gout_i \cdot 10^{\frac{58-NF}{10}},$$

, where i is the span number, $Gout_i$ is the output gain relationship of span i, and NF is the amplifier noise factor. When taking into account ripple, this equation becomes:

$$OSNR_i = P_{ref} \cdot \delta^i \cdot Gout_i \cdot 10^{\frac{58-NF}{10}},$$

, where $\delta^i$ is the estimated per-channel power deviation for a span, elevated to the power of i. Because the noise factor NF and effective length $Z_{eff}$ will not vary significantly, it is possible to neglect the $Z_{eff}$ and NF variations between the different spans. In so doing, the total OSNR deviation ($\Delta OSNR$) for the OMS is, in step 104, determined as a function of $Gout_i$ and a single measurement of $\Delta$, as follows:

$$\Delta OSNR = -10 \cdot \log\left[\frac{\sum \frac{1}{Gout_i \cdot \delta^i}}{\sum \frac{1}{Gout_i}}\right]$$

Similarly, the total NPS deviation ($\Delta NPS$) for the OMS is, in step 105, determined as a function of $Gin_i$ and a single measurement of $\Delta$, as follows:

$$\Delta NPS = 10 \cdot \log\left[\frac{\sum_i Gin_i \cdot \delta^i}{\sum Gin_i}\right]$$

Assuming that the best pre-emphasis to optimize an OMS is:

$$-(\Delta OSNR + \Delta NPS)/2$$

, the required pre-emphasis is determined and set, in step 106, to be the following:

$$\Delta(OSNR - NPS)_{OMS} = 10 \cdot \log_{10}\left[\frac{\sum_i^{amp} Gout_i \cdot \sum_i^{amp} \frac{1}{Gin_i \cdot \delta^i}}{\sum_i^{amp} Gout_i \cdot \delta^i \cdot \sum_i^{amp} \frac{1}{Gin_i}}\right]$$

As will be appreciated, this results in an estimation of the OMS power imbalance and allows a precise determination of the per-channel power deviation that is required at the WSS OMS input. This method is directed to consuming equal OSNR and NPS budgets so that the optimization can be done on a per OMS basis, without knowledge of other OMSs.

As will be appreciated, some of the steps in the above method, and the detailed features of the above described apparatus, can be modified without departing from the scope of the invention. Such modifications will be apparent to the skilled reader.

The invention claimed is:

1. A method of pre-emphasising the launch power profile of a section in an optical network, the section comprising a plurality of fibre optic spans, each span being separated by an amplifier, the method comprising the steps of:
   measuring, for each channel of the section, the output power at the output of the section;
   determining, for each channel of the section, the predicted output power associated with a flat launch power profile using design characteristics of the section;
   determining, for each channel of the section, the total power deviation between the measured output power and the predicted output power;
   determining, for each channel of each plurality of fibre optic spans, the signal to noise ratio deviation as a function of the total power deviation;
   determining, for each channel of each plurality of fibre optic spans, the nonlinear phase shift deviation as a function of the total power deviation; and
   pre-emphasising the launch power profile based on a function of the calculated signal to noise ratio deviations of each span and the calculated nonlinear phase shift deviations of each span, such that the sum of the nonlinear phase shift deviations and the sum of the signal to noise ratio deviations of each channel are reduced by an equal amount.

2. The method of claim 1, wherein:
   the step of determining the signal to noise ratio deviation further comprises using the output gain of the respective span with respect to the input power of the section; and
   the step of determining the nonlinear phase shift deviation further comprises using the input gain of the respective span with respect to the input power of the section.

3. The method of claim 1, wherein the section is an Optical Multiplex Section between two Wavelength Selective Switches.

4. The method of claim 1, wherein the power profile comprises a plurality of channels.

5. The method of claim 1, wherein the design characteristics of the section used to determine the predicted output power associated with a flat launch power profile include at least one of: the length associated with each of the plurality of spans, the type of fibre optic cable of the plurality of spans and the type of amplifier used in the section.

6. A non-transitory computer readable medium having computer readable instructions encoded therein, the computer readable instructions adapted to perform the steps of claim 1.

7. An apparatus for pre-emphasising the launch power profile of a section in an optical network, the section comprising a plurality of fibre optic spans, each span being separated by an amplifier, the apparatus comprising:
   measuring means arranged to measure, for each channel of the section, the output power at the output of the section;
   predicted output power determining means arranged to determine, for each channel of the section, the predicted output power associated with a flat launch power profile using design characteristics of the section;
   total power deviation determining means arranged to determine, for each channel of the section, the total power deviation between the measured output power and the predicted output power;
   signal to noise ratio deviation determining means arranged to determine, for each channel of each plurality of fibre optic spans, the signal to noise ratio deviation as a function of the total power deviation;

nonlinear phase shift deviation determining means arranged to determine, for each channel of each plurality of fibre optic spans, the nonlinear phase shift deviation as a function of the total power deviation; and pre-emphasis control means arranged to pre-emphasise the launch power profile based on a function of the calculated signal to noise ratio deviations of each span and the calculated nonlinear phase shift deviations of each span, such that the sum of the nonlinear phase shift deviations and the sum of the signal to noise ratio deviations of each channel are reduced by an equal amount.

8. The apparatus claim 7, wherein:

the signal to noise ratio deviation determining means is further arranged to use the output gain of the respective span with respect to the input power of the section in order to determine the signal to noise ratio deviation; and the nonlinear phase shift deviation determining means is further arranged to use the input gain of the respective span with respect to the input power of the section in order to determine the nonlinear phase shift deviation.

9. The apparatus of claim 7, wherein the section is an Optical Multiplex Section between two Wavelength Selective Switches.

10. The apparatus of claim 7, wherein the power profile comprises a plurality of channels.

11. The apparatus of claim 7, wherein the predicted output power determining means is further arranged to determine the predicted output power associated with a flat launch power profile by using at least one of: the length associated with each of the plurality of spans, the type of fibre optic cable of the plurality of spans and the type of amplifier used in the section.

* * * * *